United States Patent
Shimada (10) Patent No.: US 9,953,431 B2
(45) Date of Patent: Apr. 24, 2018

(54) IMAGE PROCESSING SYSTEM AND METHOD FOR DETECTION OF OBJECTS IN MOTION

(71) Applicant: SONY CORPORATION, Tokyo (JP)

(72) Inventor: Junji Shimada, Tokyo (JP)

(73) Assignee: SONY CORPORATION, Tokyo (JP)

( * ) Notice: Subject to any disclaimer, the term of this patent is extended or adjusted under 35 U.S.C. 154(b) by 79 days.

(21) Appl. No.: 15/238,535

(22) Filed: Aug. 16, 2016

(65) Prior Publication Data

US 2017/0287143 A1 Oct. 5, 2017

Related U.S. Application Data

(60) Provisional application No. 62/317,772, filed on Apr. 4, 2016.

(51) Int. Cl.
*G06T 7/20* (2017.01)
*H04N 5/232* (2006.01)

(52) U.S. Cl.
CPC ........... *G06T 7/2033* (2013.01); *H04N 5/232* (2013.01); *G06T 2207/10016* (2013.01)

(58) Field of Classification Search
CPC .......... G06T 7/20; G06T 7/246; G06T 7/254; G06T 7/70; G06T 7/80
See application file for complete search history.

(56) References Cited

U.S. PATENT DOCUMENTS

| 8,526,500 | B2 | 9/2013 | Poon et al. ............ H04N 7/50 |
| 9,213,898 | B2 | 12/2015 | Gurbuz ............. G06K 9/00711 |
| 2011/0234825 | A1 | 9/2011 | Liu et al. .................. 348/208.5 |
| 2013/0258141 | A1* | 10/2013 | Kim et al. ............ H04N 5/235 348/241 |
| 2015/0319375 | A1 | 11/2015 | Gurbuz ................ H04N 5/2625 |

OTHER PUBLICATIONS

Xiaoming Chen et al., "SaVE: Sensor-assisted Motion Estimation for Efficient H.264/AVC Video Encoding", MM 09 Proceedings of the 17th ACM international conference on Multimedia, ISBN: 978-1-60558-608-3, ACM, USA, OCT. 19-24, 2009, pp. 10.

Xueming Qian, "Global Motion Estimation and its Applications", Video Compression, ISBN 978-953-51-0422-3, InTech, Mar. 23, 2012, pp. 19.

* cited by examiner

*Primary Examiner* — Andrew W Johns
(74) *Attorney, Agent, or Firm* — Chip Law Group (57) ABSTRACT

Various aspects of a system and a method are provided for detection of objects in motion are disclosed herein. In accordance with an embodiment, the system includes an electronic device, which computes a first motion vector based on a difference of pixel values of one or more pixels in a current frame with respect to a previous frame. The current frame and the previous frame comprises at least an object in motion. The system further computes a second motion vector by use of motion-based information obtained from a sensor in the electronic device. The system determines validation of the first motion vector based on the second motion vector and one or more criteria and extracts the object in motion from the current frame based on the determined validation of the first motion vector.

20 Claims, 4 Drawing Sheets

FIG. 4

IMAGE PROCESSING SYSTEM AND METHOD FOR DETECTION OF OBJECTS IN MOTION

CROSS-REFERENCE TO RELATED APPLICATIONS/INCORPORATION BY REFERENCE

This application claims priority to U.S. Provisional Patent Application Ser. No. 62/317,772 filed on Apr. 4, 2016, the entire content of which is hereby incorporated by reference.

FIELD

Various embodiments of the disclosure relate to an image processing system and method for detection of objects in motion. More specifically, various embodiments of the disclosure relate to image processing system and method for detection of objects in motion by use of motion sensors.

BACKGROUND

Recent advancements in the field of image processing have led to development of various methods and techniques for detection of objects in motion. Typically, the detection of the objects in motion may be performed based on a global motion vector for each object in motion. The global motion vector may be calculated based on comparison of a current frame with respect to a previous frame. Thereafter, the extraction of the objects in motion may be performed based on subtraction of an image of fitted previous frame from an image of the current frame.

However, in certain scenarios, the calculation of such global motion vector may be incorrect due to various intrinsic and/or extrinsic factors, such as large foreground movement, blur, parallax, illuminance change, and/or roller shutter effect. Accordingly, the objects in motion may not be detected correctly. Further, the detected parts of the objects in motion may not correspond to the actual objects in motion in the image. Consequently, the extraction of the objects in motion in the image may not be accurate. Thus, an advanced, efficient, and accurate image processing system and/or technique may be required for an improved performance of extraction of objects in motion.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An image processing system and a method are provided for detection of objects in motion substantially as shown in, and/or described in connection with, at least one of the figures, as set forth more completely in the claims.

These and other features and advantages of the present disclosure may be appreciated from a review of the following detailed description of the present disclosure, along with the accompanying figures, in which like reference numerals refer to like parts throughout.

DETAILED DESCRIPTION

The following described implementations may be found in the disclosed system and method for detection of objects in motion. Exemplary aspects of the disclosure may include an image processing method implemented by one or more circuits of an electronic device. The image processing method may include computation of a first motion vector based on a difference of pixel values of one or more pixels in a current frame with respect to a previous frame. The current frame and the previous frame may comprise at least an object in motion. Further, the image processing method may include computation of a second motion vector by use of motion-based information obtained from a sensor in the electronic device. Furthermore, the image processing method may include determination of validation of the first motion vector based on the second motion vector and one or more criteria. Based on the determined validation of the first motion vector, the object in motion from the current frame may be extracted. In accordance with an embodiment, the image processing method may further compute the second motion vector based on the first motion vector and information determined by a plurality of circuits of the one or more circuits in the electronic device in an event that at least a steady-shot functionality is enabled in the electronic device.

In accordance with an embodiment, the first motion vector may be determined to be valid in an event that, in accordance with a first criterion of the one or more criteria, a distance between the first motion vector and the second motion vector is smaller than a determined first threshold value. In accordance with an embodiment, the first motion vector may be determined to be valid in an event that, in accordance with a second criterion of the one or more criteria, an angle between the first motion vector and the second motion vector is smaller than a determined second threshold value. In accordance with an embodiment, the first motion vector is further determined to be valid in an event that, in accordance with the second criterion of the one or more criteria, a magnitude of the second motion vector is smaller than a determined threshold noise value. In accordance with an embodiment, the first motion vector may be determined to be valid in an event that, in accordance with a third criterion of the one or more criteria, a rotational output of the sensor in the electronic device is smaller than a determined third threshold value.

In accordance with an embodiment, the first motion vector may be associated with a similarity metric between pixel values of one or more pixels between the current frame and the previous frame. In accordance with an embodiment, the computation of the second motion vector may be further based on one or more device parameters of the electronic device, wherein the one or more device parameters comprise, for example, a focal length of a lens of the electronic device, and number of horizontal pixels and width of an imager component included in the electronic device. In accordance with an embodiment, the extraction of the object in motion from the current frame may be based on the second motion vector in an event that the first motion vector is determined to be invalid.

In accordance with an embodiment, the sensor in the electronic device may be a motion sensor. In accordance with an embodiment, the first motion vector may correspond to an image-based global motion vector, and the second motion vector may correspond to a motion sensor-based global motion vector. In accordance with an embodiment, the electronic device may correspond to an imaging device that is configured to capture the current frame and the previous frame.

Figure 1:
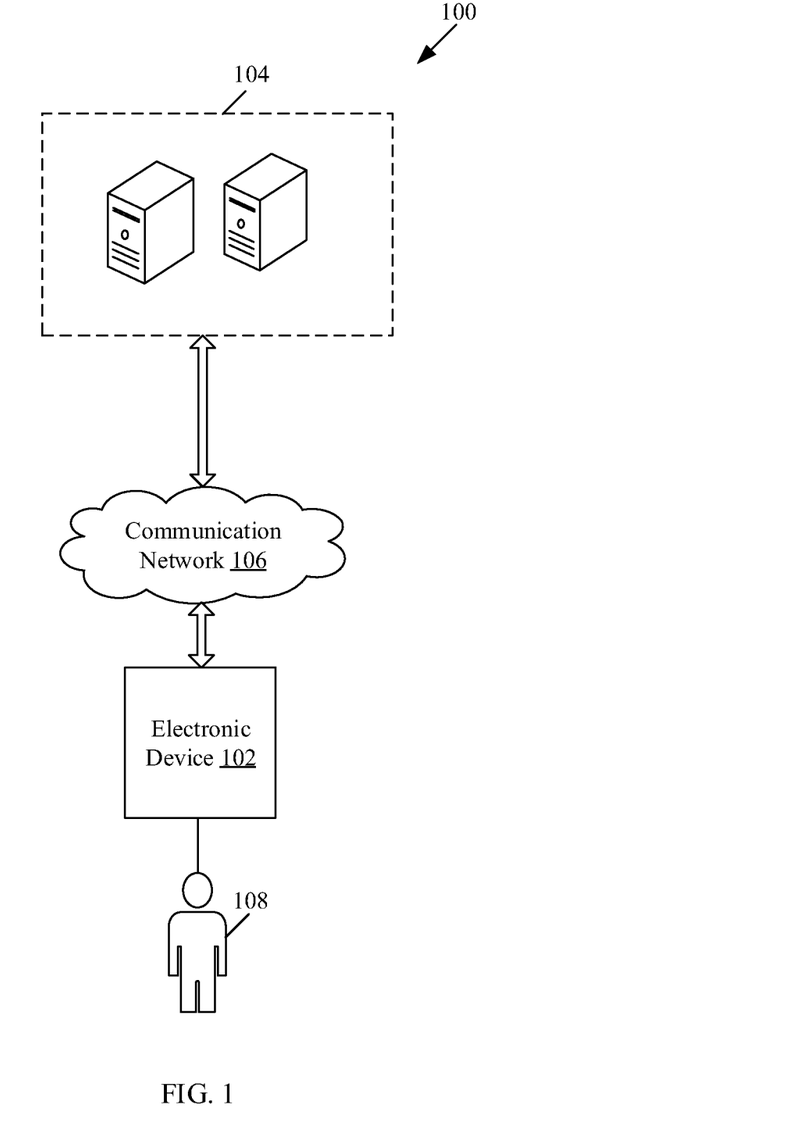
FIG. 1 is a block diagram that illustrates a network environment for detection of objects in motion in an image processing system, in accordance with an embodiment of the disclosure.

FIG. 1 is a block diagram that illustrates a network environment for detection of objects in motion in an image processing system, in accordance with an embodiment of the disclosure. With reference to FIG. 1, there is shown an exemplary network environment 100. The network environment 100 may also be referred to as a network system. The network environment 100 may include an electronic device 102, a server 104, a communication network 106, and one or more users, such as a user 108. With reference to FIG. 1, the electronic device 102 may be communicatively coupled to the server 104, via the communication network 106. The user 108 may be associated with the electronic device 102.

The electronic device 102 may comprise suitable logic, circuitry, interfaces, and/or code that may be configured to communicate with the server 104. The electronic device 102 may further include one or more circuitries that may be configured to detect and extract one or more objects in motion in a video. Examples of the electronic device 102 may include, but are not limited to, an imaging device, such as a camera, a camcorder, an image- or video-processing device, a motion-capture system, and/or a projector.

The server 104 may comprise a plurality of logic circuits, interfaces, and/or code that may be configured to communicate with the electronic device 102. The server 104 may further include one or more circuitries that may be configured to detect and extract one or more objects in motion in a video. Examples of the server 104 may include, but are not limited to a web server, a database server, a file server, an application server, or a combination thereof. The server 104 may be implemented by use of several technologies that are well known to those skilled in the art.

The communication network 106 may include a medium through which the electronic device 102 and the server 104 may communicate with each other. The communication network 106 may be a wired or wireless communication network. Examples of the communication network 106 may include, but are not limited to, a Wireless Fidelity (Wi-Fi) network, a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), a Metropolitan Area Network (MAN), and/or the Internet. Various devices in the network environment 100 may be configured to connect to the communication network 106, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, Long Term Evolution (LTE), Light Fidelity (Li-Fi), and/or other cellular communication protocols or Bluetooth (BT) communication protocols, including variants thereof.

In operation, the electronic device 102 may correspond to an imaging device that may be used to capture a video of a scene. The video may include a plurality of image frames, such as at least a current frame and a previous frame. The captured video may include at least an object in motion. The electronic device 102 may be configured to compute a first motion vector based on a difference of pixel values of one or more pixels in the current frame with respect to the previous frame. In accordance with an embodiment, the first motion vector may correspond to an image-based global motion vector. The computation of the first motion vector, i.e. the image-based global motion vector, is explained in detail in FIG. 2.

Further, the electronic device 102 may be configured to compute a second motion vector by use of motion-based information received from a sensor included in the electronic device 102. The sensor included in the electronic device 102 may correspond to a motion sensor, such as a gyro sensor. In accordance with an embodiment, the second motion vector may correspond to a motion sensor-based global motion vector, such as a gyro sensor-based global motion vector. The computation of the second motion vector, i.e. the motion sensor-based global motion vector, is explained in detail in FIG. 2.

The electronic device 102 may be further configured to determine a validation of the first motion vector, based on the second motion vector and one or more criteria. The validation determination of the first motion vector is explained in detail in FIG. 2 and FIG. 4. The one or more criteria may include at least one or more of a first criterion, a second criterion, and a third criterion.

In accordance with an embodiment, the first criterion may correspond to a distance between the first motion vector and the second motion vector that may be smaller than a determined first threshold value. In accordance with an embodiment, the second criterion may correspond to an angle between the first motion vector and the second motion vector that may be smaller than a determined second threshold value. The second criterion may further correspond to a magnitude of the second motion vector that may be smaller than a determined threshold noise value. In accordance with an embodiment, the third criterion of the one or more criteria for the verification of the first motion vector corresponds to a rotational output of the sensor in the electronic device is smaller than a determined third threshold value. Based on the validation of the first motion vector, the electronic device 102 may be further configured to extract objects in motion from the current frame.

In accordance with an embodiment, the electronic device 102 may be further configured to compute the second motion vector based on the first motion vector and information determined by a plurality of circuits of the one or more circuits included in the electronic device 102, in an event that at least a steady-shot functionality is enabled in the electronic device 102.

In accordance with another aspect of the disclosure, the electronic device 102 may be configured to transmit the plurality of image frames, such as the current frame and the previous frame, to the server 104, via the communication network 106. The server 104 may be configured to process the received plurality of image frames, received from the electronic device 102, for computation of the first motion vector and the second motion vector. The server 104 may be further configured to validate the accuracy of the first motion vector. Based on the validation of the first motion vector, the server 104 may be configured to extract the object in motion from the current frame. The server 104 may be further configured to transmit the extracted objects in motion to the electronic device 102, via the communication network 106.

Figure 2:
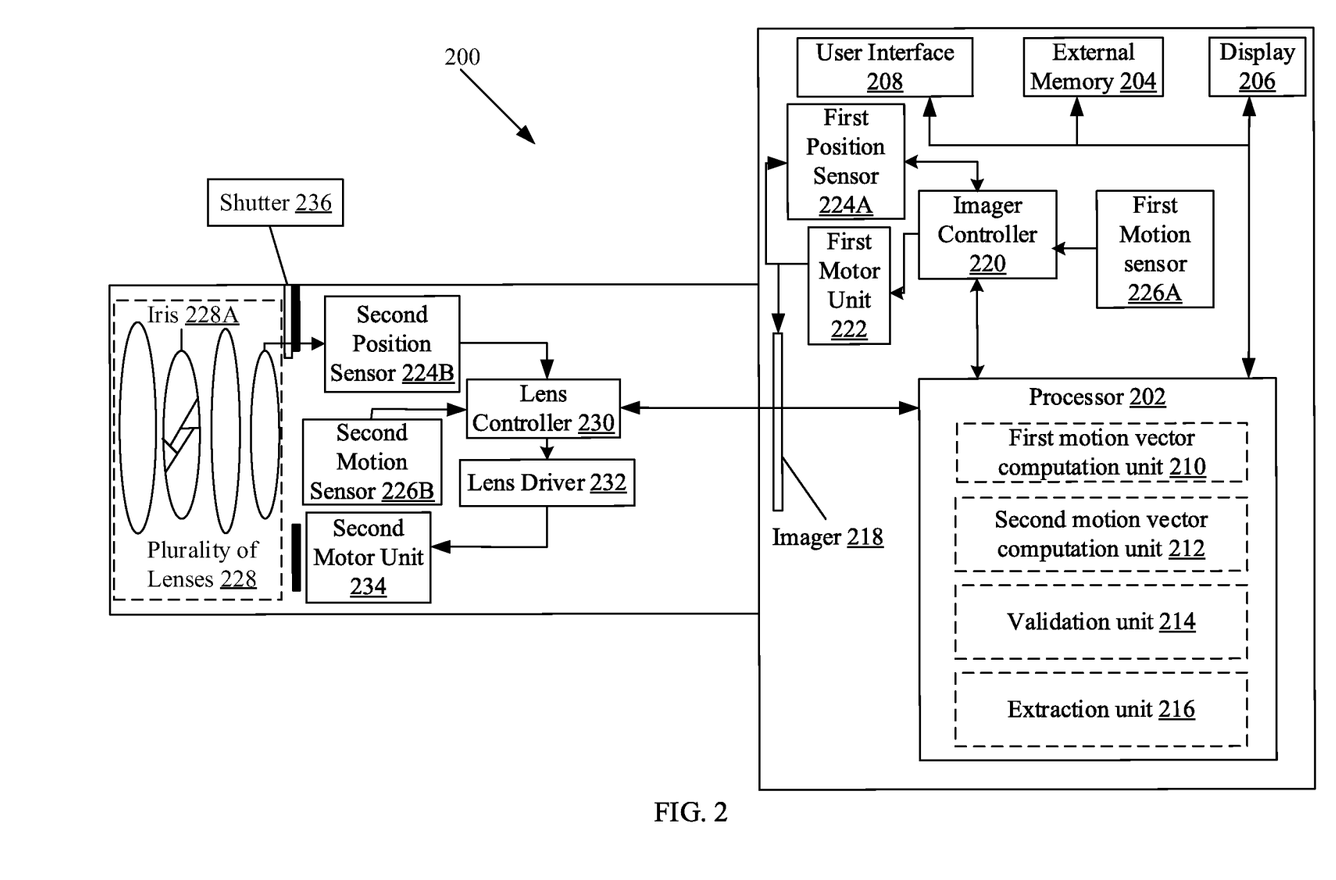
FIG. 2 is a block diagram that illustrates an electronic device of an image processing system, in accordance with an embodiment of the disclosure.

FIG. 2 is a block diagram of an image processing system, in accordance with an embodiment of the disclosure. With reference to FIG. 2, a block diagram 200 may include one or more circuits configured to extract objects in motion from the plurality of images. The one or more circuits may broadly include for example, a processor 202, an external memory 204, a display 206, and a user interface 208. The processor 202 further includes a plurality of motion vector computation units, such as a first motion vector computation unit 210 and a second motion vector computation unit 212, a validation unit 214, and an extraction unit 216. The one or more circuits may further include an imager 218, with defined dimensions, controlled by an imager controller 220 with the aid of a first motor unit 222. Furthermore, the one or more circuits may include a plurality of sensors, such as a first position sensor 224A, and a second position sensor 224B, a first motion sensor 226A (for example, a gyro sensor) and a second motion sensor 226B. The one or more circuits may further include a lens controller 230, a lens driver 232, and a second motor unit 234. The block diagram 200 may further include a plurality of lenses 228, controlled by the lens controller 230 and the lens driver 232 with aid of the second motor unit 234. The plurality of lenses 228 may further include an iris 228A. There is further shown a shutter 236 in the block diagram 200. The shutter 236 may allow light to pass for a determined period, exposing the imager 218 to light in order to capture a plurality of image frames.

As an exemplary embodiment, the block diagram 200 is shown to be implemented in an exemplary electronic device, such as the electronic device 102. However, in accordance with an embodiment, the block diagram 200 may be implemented in an exemplary server, such as the server 104, without deviation from the scope of the disclosure.

With reference to FIG. 2, the one or more circuits, such as the processor 202, the external memory 204, and the display 206 may be interconnected with each other. The user interface 208 may be rendered on the display 206. The processor 202 may be configured to receive the output of plurality of sensors, such as the first position sensor 224A and the first motion sensor 226A. The output of the plurality of sensors, such as the first position sensor 224A and the first motion sensor 226A, may be provided to the plurality of the motion vector generation units, such as the first motion vector computation unit 210 and the second motion vector computation unit 212 included in the processor 202. The output of each of the plurality of motion vector generation units may be provided to the validation unit 214. The output from the validation unit 214 may be provided to the extraction unit 216. The imager 218 is coupled to one of the plurality of sensors, such as the first position sensor 224A. The plurality of lenses 228 are coupled to the lens controller 230 and the lens driver 232. The plurality of lenses 228 may be controlled by the lens controller 230 in conjunction with the processor 202.

The processor 202 may comprise suitable logic, circuitry, interfaces, and/or code that may be operable to execute a set of instructions stored in the external memory 204. The processor 202 may be further configured to extract the object in motion from a video, captured by the electronic device 102. The processor 202 may be implemented based on a number of electronic control unit technologies known in the art. Examples of the processor 202 may be an X86-based processor, a Reduced Instruction Set Computing (RISC) processor, an Application-Specific Integrated Circuit (ASIC) processor, a Complex Instruction Set Computing (CISC) processor, and/or other processors.

The external memory 204 may comprise suitable logic, circuitry, and/or interfaces that may be operable to store a machine code and/or a computer program with at least one code section executable by the processor 202. The external memory 204 may further be operable to store a plurality of image frames, such as the current frame and the previous frame, captured by the electronic device 102. The external memory 204 may be further operable to store operating systems and associated applications of the electronic device 102. Examples of implementation of the external memory 204 may include, but are not limited to, Random Access Memory (RAM), Read Only Memory (ROM), Hard Disk Drive (HDD), Flash memory, and/or a Secure Digital (SD) card.

The display 206 may comprise suitable logic, circuitry, and/or interfaces that may be operable to render the user interface 208. The display 206 may be realized through several known technologies, such as, but not limited to, Liquid Crystal Display (LCD) display, Light Emitting Diode (LED) display, and/or Organic LED (OLED) display technology.

The user interface 208 may comprise suitable interfaces that may be rendered on the display 206 of the electronic device 102. The user interface 208 may present a video, captured by the electronic device 102. The user interface 208 may further present resultant image frames generated by the electronic device 102.

The first motion vector computation unit 210 may comprise suitable logic, circuitry, and/or interfaces that may be configured to implement various mathematical functions for computation of an image-based global motion vector from a current frame and a previous frame. The first motion vector computation unit 210 may be implemented as a separate processor or circuitry in the electronic device 102. The first motion vector computation unit 210 and the processor 202 may be implemented as an integrated processor or a cluster of processors that perform the functions of the first motion vector computation unit 210 and the processor 202. The first motion vector computation unit 210 may be implemented as a set of instructions stored in the external memory 204, which on execution by the processor 202 may perform the functions of the electronic device 102.

The second motion vector computation unit 212 may comprise suitable logic, circuitry, and/or interfaces that may be configured to receive information from a sensor, such as the first motion sensor 226A, for computation of a motion sensor-based global motion vector. The motion sensor-based global motion vector may be computed based on angular velocity information obtained from the first motion sensor 226A. The second motion vector computation unit 212 may be implemented as a separate processor or circuitry in the electronic device 102. The second motion vector computation unit 212 and the processor 202 may be implemented as an integrated processor or a cluster of processors that perform the functions of the second motion vector computation unit 212 and the processor 202. The second motion vector computation unit 212 may be implemented as a set of instructions stored in the external memory 204, which on execution by the processor 202 may perform the functions of the electronic device 102.

The validation unit 214 may comprise suitable logic, circuitry, and/or interfaces that may be configured to perform the validation of the first motion vector, such as the image-based global motion vector, by use of the first motion vector and the one or more criteria. The validation unit 214 may be implemented as a separate processor or circuitry in the electronic device 102. The validation unit 214 and the processor 202 may be implemented as an integrated processor or a cluster of processors that perform the functions of the validation unit 214 and the processor 202. The validation unit 214 may be implemented as a set of instructions stored in the external memory 204, which on execution by the processor 202 may perform the functions of the electronic device 102.

The extraction unit 216 may comprise suitable logic, circuitry, and/or interfaces that may be configured to extract the objects in motion from the current frame, based on the determined validation of the first motion vector provided by the validation unit 214. The extraction unit 216 may be implemented as a separate processor or circuitry in the electronic device 102. The extraction unit 216 and the processor 202 may be implemented as an integrated processor or a cluster of processors that perform the functions of the extraction unit 216 and the processor 202. The extraction unit 216 may be implemented as a set of instructions stored in the external memory 204, which on execution by the processor 202 may perform the functions of the electronic device 102.

The imager 218 may comprise suitable circuitry and/or interfaces that may be configured to transform the images from the analog light signals into a series of digital pixels without any distortion. Examples of implementation of the imager 218 may include, but are not limited to, Charge-Coupled Device (CCD) imagers and Complementary Metal-Oxide-Semiconductor (CMOS) imagers.

The imager controller 220 may comprise suitable logic, circuitry and/or interfaces that may be configured to control orientation or direction of the imager 218, based on the instructions received from the processor 202. The imager controller 220 may be further configured to control the movement of the first motor unit 222 to move the imager 218 for image stabilization. The imager controller 220 may be implemented by use of several technologies that are well known to those skilled in the art.

The first motor unit 222 may comprise suitable circuitry that may be configured to drive the imager 218, based on the output of the imager controller 220. The first motor unit 222 may be further configured to move the imager 218 for image stabilization. The first motor unit 222 may be implemented by use of several technologies that are well known to those skilled in the art.

The position sensors, such as the first position sensor 224A and the second position sensor 224B may comprise suitable logic, circuitry, and/or interfaces that may be configured to determine position, such as absolute position or a displacement position, of the various optical components, such as the plurality of lenses 228 and the imager 218 and for image stabilization. Examples of implementation of the position sensors 224A and 224B may include, but are not limited to, a linear position sensor, an angular position sensor, or a multi-axis position sensor.

The motion sensors, such as the first motion sensor 226A and the second motion sensor 226B may comprise suitable logic, circuitry, and/or interfaces that may be configured to detect movement (linear or angular) in a device, such as the electronic device 102. Examples of implementation of the motion sensors 226A and 226B may include, but are not limited to, gyro sensor, accelerometer and/or the like.

The plurality of lenses 228 may correspond to an optical lens or assembly of lenses used in conjunction with a camera body and mechanism to capture images of objects. The images may be captured either on photographic film or on other media, capable to store an image chemically or electronically.

The lens controller 230 may comprise suitable logic, circuitry, and/or interfaces that may be configured to control various characteristics, such as zoom, focus, and iris or aperture, of the plurality of lenses 228 or may be configured for image stabilization. The lens controller 230 may internally be a part of an imaging unit of the electronic device 102 or may be a stand-alone unit, in conjunction with the processor 202. The lens controller 230 may be implemented by use of several technologies that are well known to those skilled in the art.

The lens driver 232 comprise suitable logic, circuitry, and/or interfaces that may be configured to perform zoom and focus control and iris control, based on instructions received from the lens controller 230. The lens driver 232 may be implemented by use of several technologies that are well known to those skilled in the art.

The second motor unit 234 may comprise suitable circuitry that may be configured to control the plurality of lenses 228, based on the output of the lens controller 230 and the lens driver 232. The second motor unit 234 may be implemented by use of several technologies that are well known to those skilled in the art.

In operation, the exemplary electronic device, such as the electronic device 102, may capture the plurality of image frames, through the plurality of lenses 228. The plurality of lenses 228 may be controlled by the lens controller 230 and the lens driver 232, in conjunction with the processor 202. The plurality of lenses 228 may be controlled based on an input signal received from a user. The input signal may be provided by the user, via a selection of a graphical button rendered on the user interface 208 or a button-press event of a hardware button available at the electronic device 102. Alternatively, the electronic device 102, may retrieve the plurality of image frames pre-stored in the external memory 204. The plurality of image frames may correspond to a video, such as a video clip, and may include at least a current frame and a previous frame.

The first motion vector computation unit 210 in the processor 202 may be configured to compute a first motion vector, such as an image-based global motion vector. The first motion vector computation unit 210 may compute the first motion vector based on a determination of difference of pixel values of one or more pixels between the current frame and the previous frame. Such difference of pixel values of one or more pixels between the current frame and the previous frame may be determined based on various mathematical functions or similarity metrics, known in the art. Examples of such mathematical functions may include, but are not limited to, a sum of absolute difference (SAD) function, a sum of squared difference (SSD) function, a weighted sum of absolute difference (WSAD) function, and/or a weighted sum of squared difference (WSSD) function. Notwithstanding, other mathematical functions known in the art may also be implemented for determination of the difference of pixel values, without deviation from the scope of the disclosure.

In accordance with an exemplary embodiment, the processor 202 may determine the difference of pixel values of one or more pixels between the current frame and the previous frame, based on the similarity metric, such as the SAD function, expressed as the following mathematical expression (1):

$$SAD = \sum_{j=0}^{N-1} \sum_{i=0}^{M-1} I_t(i,j) - I_{t-1}(i,j) \quad (1)$$

where,
$I_t(i,j)$ corresponds to an illuminance value of a pixel in the current frame located at $i^{th}$ row and $j^{th}$ column;
$I_{t-1}(i,j)$ corresponds to an illuminance value of a pixel in the previous frame located at $i^{th}$ row and $j^{th}$ column;
N, M corresponds to maximum values of $i^{th}$ row and $j^{th}$ column in the current frame and the previous frame; and
SAD corresponds to sum of absolute difference between one or more pixels of the current frame and the previous frame.

Based on the determined difference of pixel values of one or more pixels (based on the SAD function), the processor 202 may further determine a minimum SAD difference of pixel values. The minimum SAD difference of pixel values may be determined, based on the following mathematical expression (2):

$$\arg_{i,j} \min SAD \quad (2)$$

where,
$\arg_{i,j}$ corresponds to argument of the minimum SAD difference of pixel values.

Thereafter, based on the argument of the minimum SAD difference of pixel values, the first motion vector computation unit 210 may compute the first motion vector, $\vec{V}_{image\_based}$. In accordance with an embodiment, the first motion vector may correspond to an image-based global motion vector that may include an indication of movement of pixels in the current frame with respect to the previous frame. Such movement of the pixels may be represented by the following mathematical expression (3):

$$movement_{image\text{-}based}[pixel] = \vec{v}_{image\_based} \quad (3)$$

Further, the second motion vector computation unit 212 in the processor 202 may be configured to compute a second motion vector, such as the motion sensor-based global motion vector. The second motion vector computation unit 212 may compute the second motion vector by use of motion-based information provided by one of the plurality of sensors, such as the first motion sensor 226A. The motion-based information may correspond to an angular velocity information. The computation of the second motion vector may be further based on one or more device parameters of the exemplary electronic device, such as the electronic device 102. Examples of the one or more device parameters may include, but are not limited to, effective focal length of the plurality of lenses 228 and number of horizontal pixels and width of the imager 218.

Thereafter, the second motion vector computation unit 212 may determine a motion sensor-based motion vector, $\vec{V}_{gyro\_based}$. The second motion vector may indicate movement of pixels in the current frame with respect to the previous frame based on one of the plurality of sensors, such as the first motion sensor 226A. Such movement of the pixels may be represented by the following mathematical expression (4):

$$movement_{gyro}[pixel] = \frac{movement_{gyro}[m]}{Imager\ size\ per\ pixel\ [m]} \quad (4)$$

where, $$movement_{gyro}[m] = f\ \tan\left(\theta \frac{\pi}{180}\right);$$

and
where, $$\theta = \vec{\omega} \Delta t;$$

where,
$\theta$ corresponds to moving angle;
$\vec{\omega}$ [deg/sec] corresponds to angular velocity information provided from one of the plurality of sensors, such as the first motion sensor 226A;
$\Delta t$ corresponds to the time duration in seconds [sec]; and
f [mm] corresponds to focal length of a lens.
Imager size per pixel $[m] = X/H*10^{-3}$
where,
X corresponds to width of the imager 218; and
H corresponds to the number of horizontal pixels of the imager 218.

In accordance with an embodiment, the second motion vector computation unit 212 may be further configured to compute the second motion vector based on the first motion vector computed by the first motion vector computation unit 210 and information determined by a plurality of circuits of the one or more circuits in the electronic device 102, in an event that at least a steady-shot functionality of the electronic device 102 may be enabled. The plurality of circuits of the one or more circuits may include the imager controller 220 and the lens controller 230. In accordance with an embodiment, the second motion vector may be computed by subtraction of the information determined by the imager controller 220 and the lens controller 230 from the first motion vector, such as the image-based global motion vector, computed by the first motion vector computation unit 210. The enablement of the steady-shot functionality of the electronic device 102 may reduce the effects of various intrinsic and/or extrinsic factors, such as blur, parallax, associated with the first motion vector, such as the image-based global motion vector. In accordance with an embodiment, in an event that the steady-shot functionality that is associated with an imager or a lens is enabled, then the real movement (Real_Movement) data of the electronic device 102 may be calculated as: Real_Movement=movement_gyro−movement_steady_shot, where movement_gyro refers to movement data from a gyro sensor and movement_steady_shot is a value related to movement of the imager when steady-shot functionality associated with the imager or the lens is enabled. For instance, the steady-shot functionality typically works by moving the lens or/and the imager for cancelling a camera motion that may occur while a user is capturing an image. Thus, in such a case, the motion of the electronic device 102, i.e. the camera motion, may be calculated by using gyro sensors which are embedded in the lens or the electronic device 102 (such as a camera), as described above.

In accordance with an embodiment, the first motion vector computation unit 210 and the second motion vector computation unit 212 may communicate the computed first motion vector and the second motion vector, respectively, to the validation unit 214. The validation unit 214 may detect the validation of the first motion vector, based on the second motion vector and one or more criteria. Relevant instructions for the one or more criteria may be retrieved from the external memory 204. The one or more criteria may comprise at least one or more of a first criterion, a second criterion, and a third criterion.

In accordance with an embodiment, the first criterion may correspond to a condition in which a distance between the first motion vector and the second motion vector is smaller than a determined first threshold value. The first criterion may be mathematically expressed by the following mathematical expression (5):

$$\sqrt{(V_{x_{image\_based}} - V_{x_{gyro}})^2 + (V_{y_{image\_based}} - V_{y_{gyro}})^2} < Thres_{dist} \quad (5)$$

where, $v_{x_{gyro}}$ corresponds to the output of second motion vector in yaw direction;

$v_{y_{gyro}}$ corresponds to the output of second motion vector in pitch direction;

$V_{x_{image\_based}}$ corresponds to the output of the first motion vector, such as the image-based global motion vector in the horizontal direction;

$V_{y_{image\_based}}$ corresponds to the output of the first motion vector, such as the image-based global motion vector in the vertical direction; and $Thres_{dist}$ corresponds to the determined first threshold value.

In an instance, in an event that the first criterion is satisfied, the validation unit 214 may detect the first motion vector to be valid. In another instance, in an event that the first criterion is not satisfied, the validation unit 214 may detect the first motion vector be in invalid.

In accordance with an embodiment, the second criterion may correspond to a condition in which an angle between the first motion vector and the second motion vector is smaller than a determined second threshold value. The second criterion may further correspond to a next condition in which the magnitude of the second motion vector is smaller than a determined threshold noise value. The second criterion may be mathematically expressed by the following expressions (6) and (7):

$$\theta < Thres_\theta \quad (6)$$

$$\sqrt{v_{x_{gyro}}^2 + v_{y_{gyro}}^2} < Thres_{gyro\_noise} \quad (7)$$

where,

θ corresponds to the angle between the first motion vector and the second motion vector;

$Thres_\theta$ corresponds to a determined second threshold value;

$v_{x_{gyro}}$ corresponds to the output of second motion vector in yaw direction;

$v_{y_{gyro}}$ corresponds to the output of second motion vector in pitch direction; and $Thres_{gryo\_noise}$ corresponds to the determined threshold noise value.

In an instance, in an event that the second criterion is satisfied, the validation unit 214 may detect the first motion vector to be valid. In another instance, in an event that the second criterion is not satisfied, the validation unit 214 may detect the first motion vector be in invalid.

It may be noted that in certain embodiments, the plurality of sensors, such as the motion sensor 226A, may be associated with an internal noise component. In such embodiments, the motion sensor 226A may result in a non-zero output, due to various factors (such as mechanical vibrations or change in temperature), even if the motion sensor 226A is not in motion, or in other words, the motion sensor 226A is in a standstill state. Therefore, in order to exclude the internal noise component from the plurality of sensors, such as the motion sensor 226A, it becomes necessary that the magnitude of the second motion vector (output of the motion sensor 226A) exceeds the determined threshold noise value, as verified by the expression (7).

In accordance with an embodiment, the third criterion may correspond to a condition in which a rotational output of the first motion sensor 226A, such as the gyro sensor, is smaller than a determined third threshold value. The third criterion may be expressed by the following mathematical expression (8):

$$|v_{roll}| < Thres_{v_{roll}} \quad (8)$$

where, $v_{roll}$ corresponds to the rotational output of the first motion sensor 226A, such as the gyro sensor; and $Thres_{v_{roll}}$ corresponds to the determined third threshold value.

In an instance, in an event that the third criterion is satisfied, the validation unit 214 may detect the first motion vector to be valid. In another instance, in an event that the third criterion is not satisfied, the validation unit 214 may detect the first motion vector be in invalid. In accordance with an embodiment, the determined first threshold value, the determined second threshold value, and the determined third threshold value may depend on the type of the plurality of sensors, such as the motion sensor 226A and the motion sensor 226B.

Figure 3:
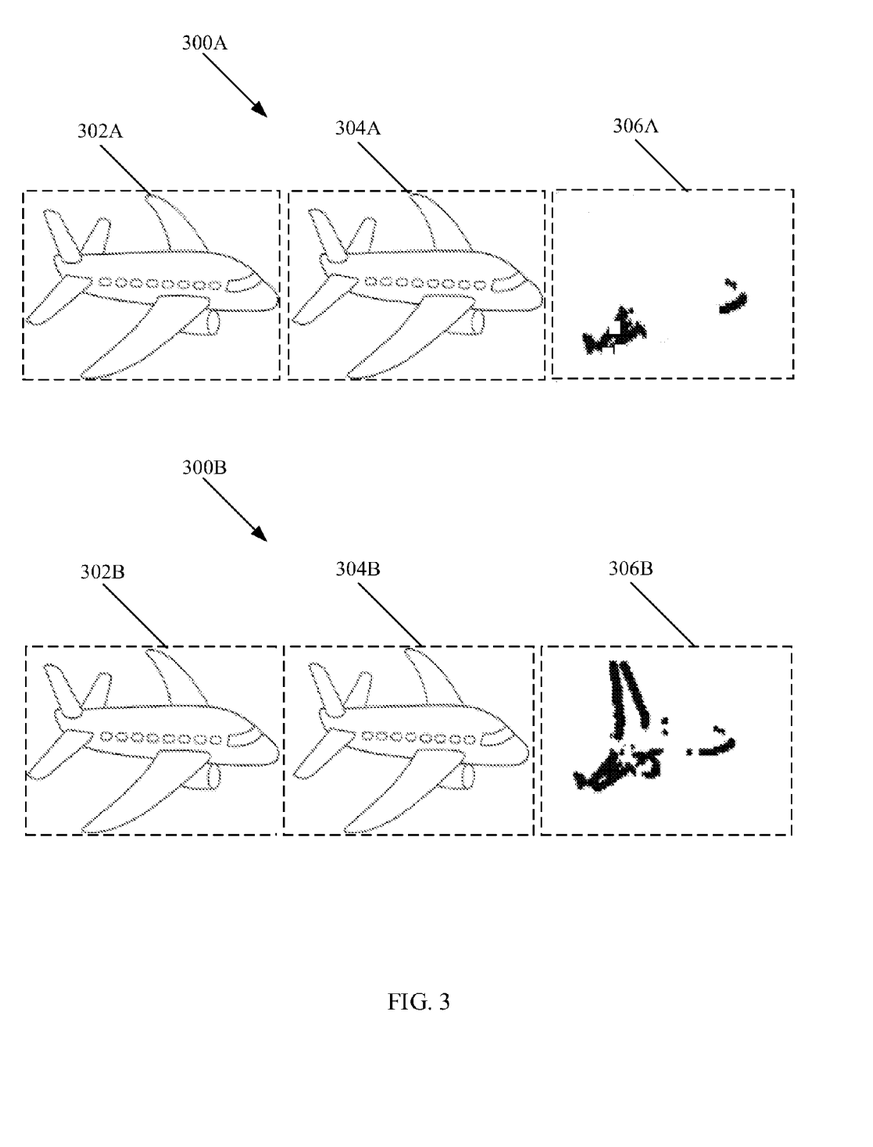
FIG. 3 illustrates an exemplary scenario for extraction of objects in motion by use of a sensor, in accordance with an embodiment of the disclosure.

Based on the validation of the first motion vector determined by the validation unit 214, in an instance, in an event that the first motion vector is valid, the extraction unit 216 may utilize the first motion vector to extract the object in motion from the current frame. An illustration of such an instance is depicted in FIG. 3. In another instance, in an event that the first motion vector is invalid, the extraction unit 216 may utilize the second motion vector to extract the object in motion from the current frame.

FIG. 3 illustrates exemplary scenarios for extraction of objects in motion, in accordance with an embodiment of the disclosure. With reference to FIG. 3, there is shown two exemplary scenarios 300A and 300B of a scene that includes a moving aircraft. The scene may be captured by an exemplary electronic device 102, such as a camcorder. The captured scene may correspond to a video and the moving aircraft may correspond to the object in motion. In the first exemplary scenario 300A, there is shown a previous image frame 302A, a current image frame 304A, and a resultant image frame 306A. In the second exemplary scenario 300B, there is shown a previous image frame 302B, a current image frame 304B, and a resultant image frame 306B.

With reference to the first exemplary scenario 300A, the previous image frame 302A may be captured at a time instant, "t−1", and the current image frame 304A may be captured at next time instant, "t". It may be assumed that the camcorder does not include the first motion sensor 226A. The first motion vector computation unit 210, in the camcorder, may compute the first motion vector, i.e. the image-based global motion vector, based on the mathematical expressions (1), (2), and (3), as described in FIG. 2, applied on the previous image frame 302A and the current image frame 304A. However, as the sky in the background of the video is low contrast with respect to the moving aircraft, the first motion vector computation unit 210 may not correctly compute the first motion vector and the moving aircraft may not be properly detected in the resultant image frame 306A.

The resultant image frame 306A showcases the one or more regions in motion for the moving aircraft. It may be noted that in most of the cases, object extraction by use of the first motion vector, i.e. the image-based global motion vector, is precise. However, in certain scenarios, the image-based global motion vector may fail due to various intrinsic and/or extrinsic factors, such as large foreground movement, blur, parallax, illuminance change, and/or roller shutter effect, as observer in the first exemplary scenario 300A. Consequently, the subsequent object extraction, with reference to the first exemplary scenario 300A, may also be inaccurate. For such cases, it may be preferred that the compute the second motion vector, i.e. the motion sensor-based global motion vector, the camcorder includes a motion sensor, such as the first motion sensor 226A, that computes the second motion vector, i.e. the motion sensor-based global motion vector, as explained in the second exemplary scenario 300B.

With reference to the second exemplary scenario 300B, the previous image frame 302B may be captured at a time instant, "t−1", and the current image frame 304B may be captured at next time instant, "t". It may be assumed that the camcorder includes the first motion sensor 226A. The first motion vector computation unit 210, in the camcorder, may compute the first motion vector, i.e. the image-based global motion vector, based on the mathematical expressions (1), (2), and (3), as described in FIG. 2, applied on the previous image frame 302B and the current image frame 304B. Further, the second motion vector computation unit 212, in the camcorder, may compute the second motion vector, i.e. the motion sensor-based global motion vector, based on the mathematical expression (4), as described in FIG. 2, applied on the previous image frame 302B and the current image frame 304B.

However, the validation unit 214 determines that the computed first motion vector, such as the image-based global motion vector, is invalid, as the distance between the first motion vector and the second motion vector is greater than a determined first threshold value. Consequently, the extraction unit 216 may utilize the information obtained from the first motion sensor 226A, i.e. the second motion vector, for extraction of the object in motion, i.e. the moving aircraft, in the resultant image frame 306B.

Figure 4:
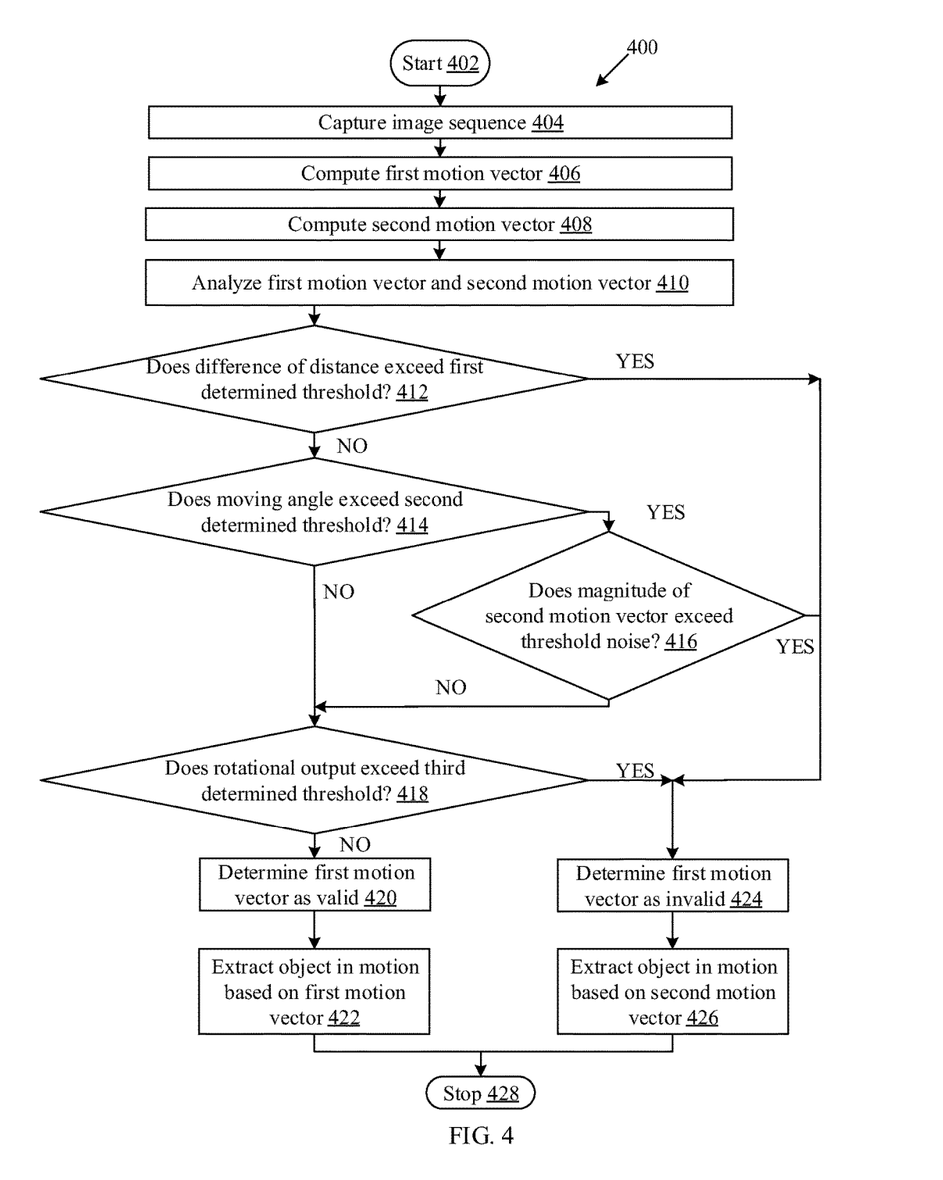
FIG. 4 depicts a flow chart that illustrates an exemplary method for detection of objects in motion in an image processing system, in accordance with an embodiment of the disclosure.

FIG. 4 depicts a flow chart that illustrates a method for detection of objects in motion in an image processing system, in accordance with an embodiment of the disclosure. With reference to FIG. 4, there is shown a flowchart 400. The flowchart 400 is described in conjunction with FIG. 2. The method starts at 402 and proceeds to 404.

At 404, an image sequence that includes a current frame and a previous frame may be captured. In accordance with an embodiment, the electronic device 102 may capture the image sequence that includes the current frame and the previous frame. In accordance with an embodiment, the electronic device 102 may retrieve the image sequence from the external memory 204.

At 404, a first motion vector may be computed. In accordance with an embodiment, the first motion vector computation unit 210 may be configured to compute the first motion vector, such as the image-based global motion vector, based on difference of pixel values of one or more pixels in a current frame with respect to a previous frame. The first motion vector may be computed based on the mathematical expressions (1), (2), and (3), as described in FIG. 2.

At 408, a second motion vector may be computed. In accordance with an embodiment, the second motion vector computation unit 212 may be configured to compute the second motion vector, such as the motion sensor-based global motion vector, based on the angular velocity information obtained from a sensor, such as the first motion sensor 226A, in the electronic device 102. The second motion vector may be computed based on, for example, the mathematical expression (4), as described in FIG. 2.

At 410, the first motion vector, such as the image-based global motion vector, and the second motion vector, such as the motion sensor-based global motion vector, may be analyzed. In accordance with an embodiment, the processor 202 may be configured to analyze the first motion vector and the second motion vector to perform validation of the first motion vector. In accordance with an embodiment, the validation of the first motion vector may be determined based on the second motion vector and one or more criteria. The one or more criteria may include at least one or more of a first criterion, a second criterion, and a third criterion.

At 412, it may be determined whether a difference of distance between the first motion vector and the second motion vector exceeds a determined first threshold value. In an instance, in an event that the difference of the distance exceeds the determined first threshold value, control passes to 424. In another instance, in an event that the difference of the distance is less than the determined first threshold value, control passes to 414.

At 414, in an event that the difference of the distance computed based on the first motion vector and the second motion vector is less than the determined first threshold value, it may be determined whether an angle between the first motion vector and the second motion vector exceeds a determined second threshold value. In an instance, in an event that the angle between the first motion vector and the second motion vector exceeds the determined second threshold value, control passes to 416. In another instance, in an event that the angle between the first motion vector and the second motion vector is less than the determined second threshold value, control passes to 418.

At 416, in an event that the angle between the first motion vector and the second motion vector exceeds the determined second threshold value, it may be further determined whether a magnitude of the second motion vector exceeds a determined threshold noise value. In an event the magnitude of the second motion vector exceeds the determined threshold noise value, control passes to 424. In another instance, in an event that the magnitude of the second motion vector is less than the determined threshold noise value, control passes to 418.

At 418, in an event that the angle between the first motion vector and the second motion vector is less the determined second threshold value and the magnitude of the second motion vector is smaller than the determined threshold noise value, it may be determined whether a rotational output of the sensor, such as the first motion sensor 226A in the electronic device 102, exceeds a determined third threshold value. In an instance, in an event that the rotational output of the sensor exceeds the determined third threshold value, control passes to 424. In another instance, in an event that the rotational output of the sensor is less than the determined third threshold value, control passes to 420.

At 420, the first motion vector is determined to be valid based on the second motion vector and the one or more criteria. In accordance with an embodiment, the validation unit 214 may determine the first motion vector to be valid. At 422, the object in motion from the current frame may be extracted. In accordance with an embodiment, the extraction unit 216 may be configured to extract the object in motion, based on the first motion vector, such as the image-based global motion vector. Control passes to end 428.

At 424, in an event that the difference between the distance exceeds the determined first threshold value, the angle between the first motion vector and the second motion vector exceeds the determined second threshold value, the magnitude of the second motion vector exceeds the determined threshold noise value, and the rotational output of the sensor exceeds the determined third threshold value, the first motion vector is determined to be invalid. At 426, the extraction unit 216 may extract the object in motion from the current frame based on the second motion vector, such as the motion sensor-based global motion vector. Control passes to end 428.

Various embodiments of the disclosure encompass numerous advantages that includes an image processing system and method for extraction of objects in motion by use of motion sensors. Further, the method also helps to determine whether an image-based global motion vector is valid or invalid. Based on the determined validation of the image-based motion vector, the accuracy of the extraction of object in motion from a current frame of an image sequence is improved. In accordance with an embodiment, in an event that the image-based global motion vector is determined to be invalid, the performance of extraction of object in motion from the current frame is improved by replacement of the image-based global motion vector by the motion sensor-based global motion vector. Such as replacement of motion vector also reduces the overall computational complexity and enhances the speed of overall image processing system. With reference to the second exemplary scenario 300B in FIG. 3, it may be observed that the object in motion is extracted with a higher degree of accuracy as compared to the extraction in the first exemplary scenario 300A, based on the sensor information, such as the second motion vector.

Further, the method may rectify the computation of the global motion vector and significantly reduces the effects of the various intrinsic and/or extrinsic factors, such as large foreground movement, blur, parallax, illuminance change, and/or roller shutter effect. Thus, the overall efficiency of detection in the image processing system is improved and also it helps to overcome the various limitations of the conventional and traditional approaches utilized in the past for extraction of the objects in motion.

In accordance with an embodiment of the disclosure, an image processing system for detection of objects in motion is disclosed. The electronic device 102 (FIG. 1) may correspond to an imaging device that may be used to capture a video. The captured video may include at least an object in motion. The electronic device 102 may comprise one or more circuits, such as the first motion vector computation unit 210 (FIG. 2), may be configured to compute a first motion vector based on a difference of pixel values of one or more pixels in a current frame with respect to a previous frame. The current frame and the previous frame may comprise at least an object in motion. The one or more circuits, such as the second motion vector computation unit 212 (FIG. 2), may compute a second motion vector based on angular velocity information obtained from a sensor, such as a first motion sensor 226A. The one or more circuits, such as the validation unit 214 (FIG. 2), may be configured to determine validation of the first motion vector, based on the second motion vector and one or more criteria. The one or more criteria may include at least one or more of a first, a second, and a third criterion. The one or more circuits, such as the extraction unit 216 (FIG. 2), may be configured to extract the object in motion from the current frame, based on the determined validation of the first motion vector.

Various embodiments of the disclosure may provide a non-transitory computer readable medium and/or storage medium, wherein there is stored thereon, a machine code and/or a computer program with at least one code section executable by a machine and/or a computer to detect objects in motion. The at least one code section in the electronic device 102 may cause the machine and/or computer to perform the steps that comprise computation of a first motion vector, based on a difference of pixel values of one or more pixels in a current frame with respect to a previous frame. The current frame and the previous frame may comprise at least an object in motion. A second motion vector may be computed based on angular velocity information obtained from a sensor, such as the first motion sensor 226A as illustrated in the block diagram 200 that may be implemented as an exemplary electronic device, such as the electronic device 102. A validation of the first motion vector may be determined based on the second motion vector and one or more criteria. The one or more criteria may include one or more of a first criterion, a second criterion, and a third criterion. The object in motion may be extracted from the current frame based on the determined validation of the first motion vector. Such set of instructions executed by the machine and/or the computer improves the functioning of the machine and/or the computer itself to significantly reduce the effects of the various intrinsic and/or extrinsic factors, such as large foreground movement, blur, parallax, illuminance change, and/or roller shutter effect.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features enabling the implementation of the methods described herein, and which when loaded in a computer system is able to carry out these methods. Computer program, in the present context, means any expression, in any language, code or notation, of a set of instructions intended to cause a system having an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodi-

What is claimed is:

1. An image processing system for detection of objects in motion, said image processing system comprising:
   one or more circuits in an electronic device configured to:
   compute a first motion vector based on a difference of pixel values of one or more pixels in a current frame with respect to a previous frame, wherein said current frame and said previous frame comprises at least an object in motion;
   compute a second motion vector by use of motion-based information obtained from a sensor in said electronic device;
   determine validation of said first motion vector based on said second motion vector and one or more criteria; and
   extract said object in motion from said current frame based on said determined validation of said first motion vector.

2. The image processing system according to claim 1, wherein said electronic device corresponds to an imaging device that is configured to capture said current frame and said previous frame.

3. The image processing system according to claim 1, wherein said first motion vector is determined to be valid in an event that, in accordance with a first criterion of said one or more criteria, a distance between said first motion vector and said second motion vector is smaller than a determined first threshold value.

4. The image processing system according to claim 1, wherein said first motion vector is determined to be valid in an event that, in accordance with a second criterion of said one or more criteria, an angle between said first motion vector and said second motion vector is smaller than a determined second threshold value.

5. The image processing system according to claim 4, wherein said first motion vector is further determined to be valid in an event that, in accordance with said second criterion of said one or more criteria, a magnitude of said second motion vector is smaller than a determined threshold noise value.

6. The image processing system according to claim 1, wherein said first motion vector is determined to be valid in an event that, in accordance with a third criterion of said one or more criteria, a rotational output of said sensor in said electronic device is smaller than a determined third threshold value.

7. The image processing system according to claim 1, wherein said first motion vector is associated with a similarity metric between pixel values of one or more pixels between said current frame and said previous frame.

8. The image processing system according to claim 1, wherein said computation of said second motion vector is further based on one or more device parameters of said electronic device, wherein said one or more device parameters comprise focal length of a lens of said electronic device, and number of horizontal pixels and width of an imager component included in said electronic device.

9. The image processing system according to claim 1, wherein said extraction of said object in motion from said current frame is based on said second motion vector in an event that said first motion vector is determined to be invalid.

10. The image processing system according to claim 1, wherein said sensor in said electronic device is a motion sensor.

11. The image processing system according to claim 1, wherein said first motion vector corresponds to an image-based global motion vector.

12. The image processing system according to claim 1, wherein said second motion vector corresponds to a motion sensor-based global motion vector.

13. An image processing method for detection of objects in motion, said image processing method comprising:
   computing a first motion vector based on a difference of pixel values of one or more pixels in a current frame with respect to a previous frame, wherein said current frame and said previous frame comprises at least an object in motion;
   computing a second motion vector by use of motion-based information obtained from a sensor in said electronic device;
   determining validation of said first motion vector based on said second motion vector and one or more criteria; and
   extracting said object in motion from said current frame based on said determined validation of said first motion vector.

14. The image processing method according to claim 13, wherein said first motion vector is determined to be valid in an event that, in accordance with a first criterion of said one or more criteria, a distance between said first motion vector and said second motion vector is smaller than a determined first threshold value.

15. The image processing method according to claim 13, wherein said first motion vector is determined to be valid in an event that, in accordance with a second criterion of said one or more criteria, an angle between said first motion vector and said second motion vector is smaller than a determined second threshold value.

16. The image processing method according to claim 15, wherein said first motion vector is further determined to be valid in an event that, in accordance with said second criterion of said one or more criteria, a magnitude of said second motion vector is smaller than a determined threshold noise value.

17. The image processing method according to claim 13, wherein said first motion vector is determined to be valid in an event that, in accordance with a third criterion of said one or more criteria, a rotational output of said sensor in said electronic device is smaller than a determined third threshold value.

18. The image processing method according to claim 13, wherein said extraction of said object in motion from said current frame is based on said second motion vector in an event that said first motion vector is determined to be invalid.

19. The image processing method according to claim 13, wherein said sensor in said electronic device is a motion sensor.

20. The image processing method according to claim 13, further computing said second motion vector based on said first motion vector and information determined by a plurality of circuits of said one or more circuits in said electronic device in an event that at least a steady-shot functionality is enabled in said electronic device.

* * * * *